(12) United States Patent
Mizuta

(10) Patent No.: US 6,476,714 B2
(45) Date of Patent: Nov. 5, 2002

(54) VEHICLE'S COMMUNICATION APPARATUS

(75) Inventor: Rika Mizuta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/778,877

(22) Filed: Feb. 8, 2001

(65) Prior Publication Data

US 2001/0035817 A1 Nov. 1, 2001

(30) Foreign Application Priority Data

Feb. 8, 2000 (JP) ........................................ 2000-030962

(51) Int. Cl.⁷ ................................................. B60Q 1/00
(52) U.S. Cl. ..................... 340/461; 340/462; 340/815.4
(58) Field of Search ................................. 340/426, 436, 340/438, 451, 903, 937, 995, 462, 815.4; 701/1, 29, 31, 36, 201, 211

(56) References Cited

U.S. PATENT DOCUMENTS

| | | | | |
|---|---|---|---|---|
| 5,917,405 A | * | 6/1999 | Joao | 340/426 |
| 6,009,355 A | * | 12/1999 | Obradovich et al. | 340/815.4 |
| 6,157,297 A | * | 12/2000 | Nakai | 340/461 |
| 6,181,994 B1 | * | 1/2001 | Colson et al. | 701/33 |
| 6,226,570 B1 | * | 5/2001 | Hahn | 701/1 |
| 6,304,173 B2 | * | 10/2001 | Pala et al. | 340/461 |

FOREIGN PATENT DOCUMENTS

JP A11250395 9/1999

* cited by examiner

*Primary Examiner*—Van Thanh Trieu
(74) *Attorney, Agent, or Firm*—Birch, Stewart, Kolasch & Birch, LLP

(57) ABSTRACT

A pseudo creature may be used to increase the user's feeling that the pseudo creature expressed in the vehicle and the vehicle are one, to allow information generated by the pseudo creature to be recognized with ease and to allow the user to communicate with a plurality of other users through the pseudo creature. A CPU employed in a display panel is capable of communicating with external apparatuses such as a PC, a hand phone and a game machine through a connection interface and a transmission & reception unit. The CPU is capable of transmitting information regarding the vehicle to an external apparatus such a PC and acquiring a character of a game or the like as a pseudo creature from electronic media or an electronic information-processing apparatus such as a PC. Thus, in addition to a pseudo creature set in advance, pseudo creatures matching hobbies of a broad range of users can also be expressed in the vehicle. The CPU lets other drivers recognize an intention and a feeling of the pseudo creature through auxiliary instruments, which are functional components of the vehicle such as a head light, blinkers and a horn.

17 Claims, 12 Drawing Sheets

| USER OPERATIONS, ECT. | VEHICLE OPERATIONS AND DISPLAYS |
|---|---|
| M1<br>SEAT SWITCH ⎯⎯⎯⎯<br>REMOTE ⎯⎯⎯⎯<br>CONTROLLER<br>VOICE CALL ⎯⎯⎯⎯ (AND/OR gates) → | R1<br>SEE APPENDIX<br>A-R1 |
| M2<br>SEAT SWITCH ⎯⎯⎯<br>POWER-SUPPLY ⎯⎯⎯ (AND) →<br>SWITCH | R1<br>SEE APPENDIX<br>A-R2 |
| M3<br>HALTED VEHICLE ⎯⎯ TIMER<br>CAR SPEED: 0 ⎯⎯ [C Q / R] → | R3<br>SEE APPENDIX<br>A-R3 |
| M4<br>RESIDUAL-FUEL F ⎯⎯ COMPARE → F<R, AR<br>AMOUNT<br>REFERENCE R ⎯⎯<br>AMOUNT<br>- - - - - - - - - - - - - - - - -<br>TIMER<br>AR ⎯⎯ [C Q / R] → TIME-UP<br>OIL ⎯⎯ OCCURS WITH<br>SUPPLY NO OIL SUPPLIED | R4<br>I AM HUNGRY<br>LET'S GO TO A GASOLINE STATION.<br>- - - - - - - - - - - - - - - - -<br>PIROPIRO ----- ELECTRONIC SOUND<br>PICTURE BLINKING |

*FIG. 8*

| | |
|---|---|
| M8<br>IMMOBILIZER → MOVEMENT DETECTION | R8<br>HORN DRIVING<br>LIGHT BLINKING<br>REPORT TO A PREDETERMINED PHONE OR PC |
| M9<br>DATA INPUT → PERSONAL-INFORMATION-CATALOGING UNIT → CATALOG THE DATA IN MEMORY | R9<br>CATALOG THE DATA IN A MEMORY |
| M10<br>APPROACHING ANOTHER VEHICLE SET IN THE SAME WAY | R10<br>SEE APPENDIX A<br>R10 |
| M11<br>CONNECTION TO A GAME MACHINE<br>TRANSMISSION OF DATA | R11<br>PARTICIPATION IN THE GAME MACHINE<br>COMMAND TO CHANGE THE SUBSTANCE OF A GAME |
| M12<br>SEE APPENDIX A<br>M12 | R12<br>RECEPTION OF CHARACTER DATA<br>TRANSMISSION OF RUNNING DATA OF THE VEHICLE TO THE PC |
| M13<br>CONNECTION TO A HAND PHONE<br>CONNECTION TO THE INTERNET | R13<br>FORTUNE-TELLING INFORMATION OR INFORMATION ON A WEATHER FORECAST IS DISPLAYED. |

*FIG. 10*

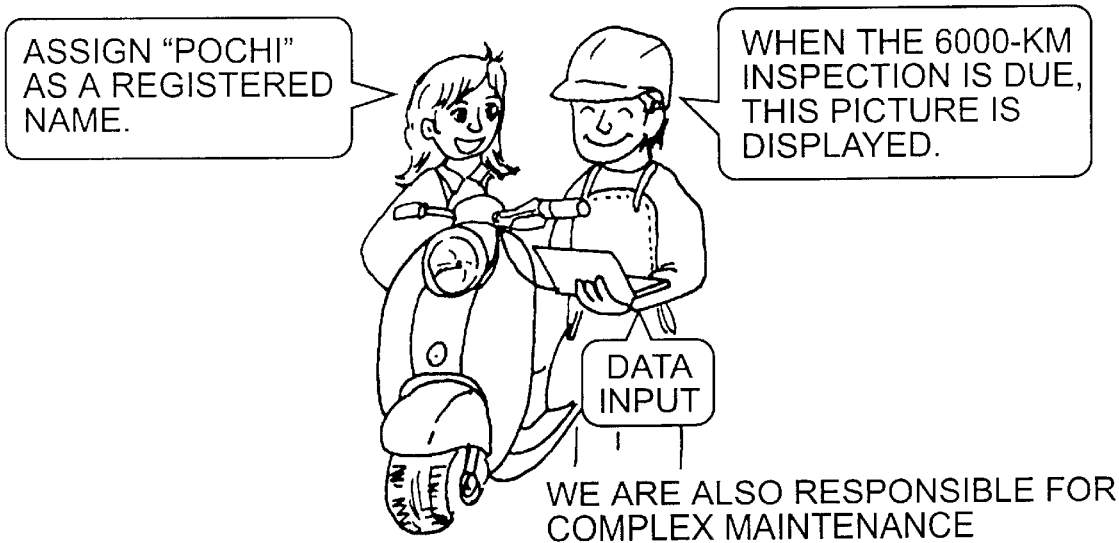
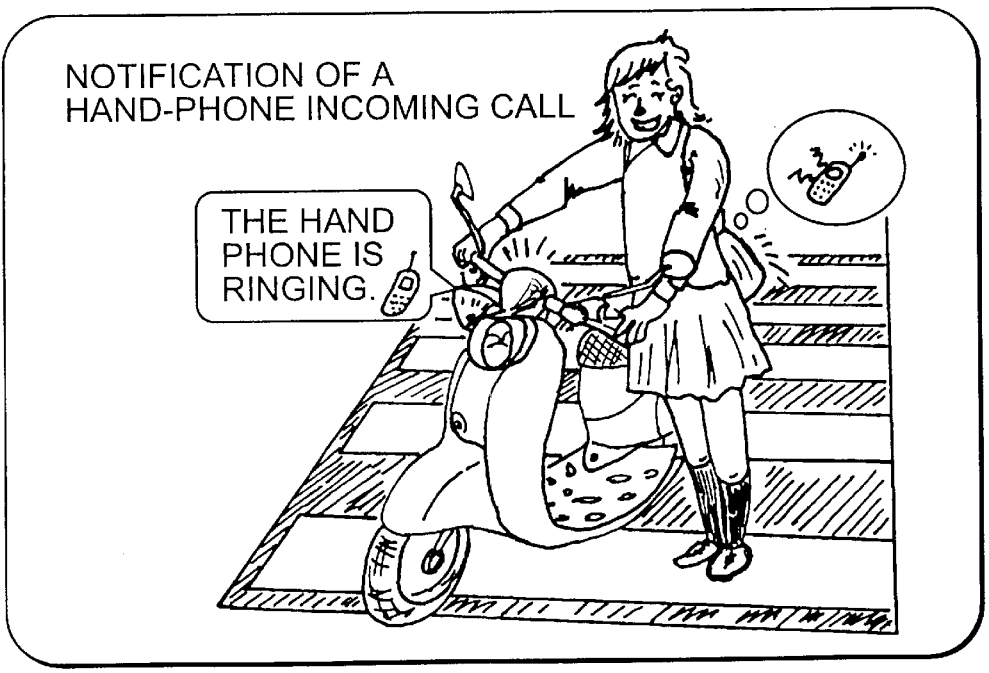
FIG. 12

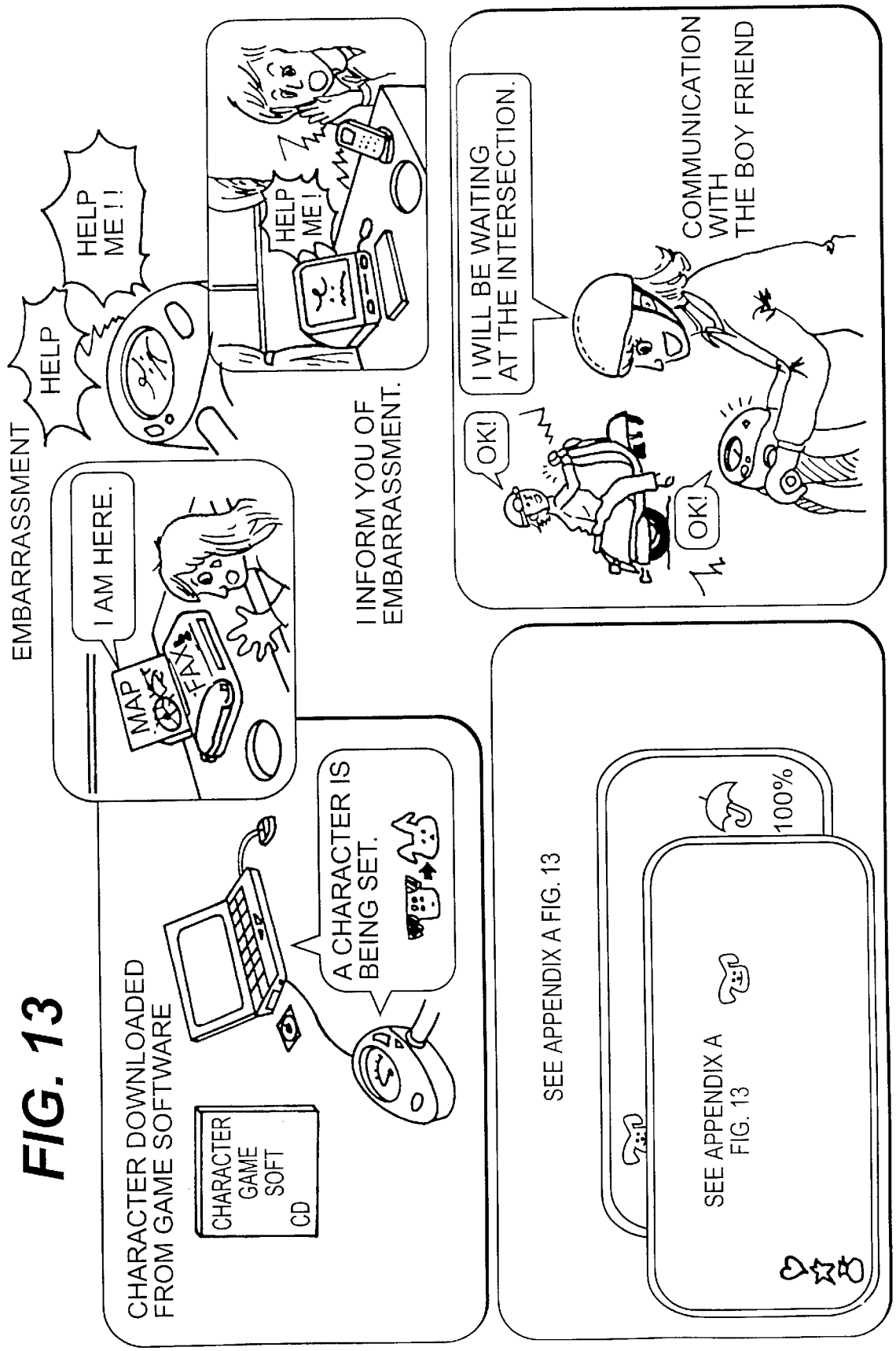

VEHICLE'S COMMUNICATION APPARATUS

BACKGROUND OF THE INVENTION

1. Field of the Invention

The present invention generally relates to a communication apparatus for a vehicle. More particularly, the present invention relates to a vehicle's communication apparatus capable of further deepening the feeling of intimacy of the driver and/or the owner of the vehicle with the vehicle, and the affection of the driver and/or the owner of the vehicle for the vehicle. It should be noted that the driver and/or the owner are regarded as a generic group referred to hereafter as the user.

2. Description of Background Art

As disclosed in Japanese Patent Laid-open No. Hei 11-250395, there has been proposed an apparatus for displaying an expression subject resembling a human being, an animal or an animation character in a vehicle as a planar or cubic picture and making the user aware of information such as the state of the vehicle and the condition of a road by means of an expression subject, which is referred to hereafter as a pseudo creature. Particularly, in this Japanese Patent Laid-open specification, a plurality of kinds of information different from each other is reported to the user through a plurality of pseudo creatures.

By virtue of the conventional apparatus described above, an expression of a pseudo creature is expected to allow the user to recognize information such as the condition of the vehicle as information of intimacy. Since displayed pseudo creatures are limited to only those set in the vehicle in advance, however, the expression of the pseudo creatures cannot be said to be necessarily sufficient for satisfying the user's strong desire for a variety of hobbies. In addition, since the user is capable of communicating with such pseudo creatures only while the user is present inside the car, it is feared that the user's affection for the car unavoidably weakens.

SUMMARY AND OBJECTS OF THE INVENTION

It is thus an object of the present invention addressing the problems described above to provide a vehicle's communication apparatus capable of satisfying the user's strong desire for a variety of hobbies, serving as an effective means for arousing the user's affection for the vehicle and sustaining a good running condition of the vehicle.

In the conventional vehicle communication apparatus, the pseudo creature communicates with the driver only through a picture and a sound. Thus, as a means for giving the driver an impression that the vehicle and the pseudo creature are one, the conventional communication apparatus is not a sufficiently complete apparatus. In particular, unlike a four-wheel vehicle, a motor-cycle does not have a cabin. Thus, the introduction of light and sound generated by external sources to the driver of a motor-cycle is not restricted. As a result, there are many cases in which, communication is difficult to establish merely by using pictures and sounds only.

It is thus a second object of the present invention to address this problem to provide a vehicle communication apparatus capable of arousing the user's intimacy with and affection for the vehicle by giving the user an impression that the vehicle and the pseudo creature are one.

In the conventional vehicle communication apparatus, the pseudo creature communicates only with the driver but not with other users of the vehicle.

It is a third object of the present invention addressing this problem to provide a vehicle communication apparatus capable of implementing not only communications between the pseudo creature and the user, but also a variety of kinds of communication between the pseudo creature and other communication partners including users of other vehicles.

In order to achieve the first object described above, the present invention provides a vehicle communication apparatus allowing a pseudo creature set in the vehicle to communicate with a communication partner outside the vehicle through a function of the vehicle. The communication apparatus has the following characteristics. As a first characteristic, the pseudo creature is introduced from electronic media outside the vehicle through a communication means mounted on the vehicle. As a second characteristic, the electronic media is a media connected to the Internet. As a third characteristic, the electronic media is a personal computer or a computer game machine and the pseudo creature is a character making its appearance in a game.

In accordance with the first to third characteristics, the pseudo creature can be changed to a variety of forms selectable as one, for setting as the pseudo character. More particularly, in accordance with the second characteristic, it is possible to acquire data required for setting a pseudo creature from the Internet. In accordance with the third characteristic, the user is allowed to select a character the user likes from a game, and adopt the character in the vehicle.

In addition, as a fourth characteristic, besides the first characteristic, the present invention also has a data-transmitting means for transmitting running data of the vehicle to the electronic media by way of the communication means. In accordance with the fourth characteristic, the running data transmitted by the data-transmitting means is used in the operation of the electronic media, making it possible to typically enhance the function of the electronic media.

Furthermore, as a fifth characteristic, the present invention has a communication means capable of communicating with an electronic information-processing apparatus outside the vehicle. Representative examples of the electronic information-processing apparatus are a telephone, a fax machine and a personal computer. As a sixth characteristic, the electronic information-processing apparatus is a personal computer set as a means used in an organ doing maintenance of the vehicle.

In accordance with the fifth and sixth characteristics, the electronic information-processing apparatus processes information received from the vehicle so as to raise the value of the utilization of the vehicle. In the case of the sixth characteristic, for example, the maintenance organ such as a vehicle dealer is capable of providing data such as information on vehicle maintenance based on information received from the vehicle.

In order to achieve the second object described above, the present invention provides a vehicle communication apparatus wherein a pseudo creature set on the vehicle is capable of communicating with a communication partner outside the vehicle through a function of the vehicle. As a seventh characteristic of the present invention, a functional component of the vehicle known as an auxiliary instrument is provided to function as a communication means of the pseudo creature, and in order for the auxiliary instrument to represent an intention and a feeling of the pseudo creature, the auxiliary instrument is driven by a state of expression set in advance.

As an eighth characteristic of the present invention, the apparatus is characterized in that the auxiliary instrument functioning as a communication means is at least either a light device or a warning device. As a ninth characteristic of the present invention, a light device provided on a front portion of the vehicle to serve as an auxiliary instrument is blinking when expressing a movement of an eye of the pseudo creature. As a tenth characteristic of the present invention, a light device provided on a rear portion of the vehicle to serve as an auxiliary instrument is blinking when expressing a movement of a tail of the pseudo creature. As a eleventh characteristic of the present invention, a warning device serving as an auxiliary instrument is activated when expressing a cry of the pseudo creature.

In accordance with the seventh to eleventh characteristics, an intention and a feeling of the pseudo creature, that is, the state of the vehicle, or a response to an access made by an external accessor are expressed in the external accessor by a functional component provided on the vehicle in advance. Thus, the driver is capable of easily recognizing information expressed by the pseudo creature. The light devices can be activated to generate pseudo movements of the eyes and the tail of the pseudo creature whereas the warning device can be actuated to produce a pseudo cry of the pseudo creature. As a result, it is possible to impress the driver that the entire vehicle and the pseudo creature are one and, hence, to further deepen the intimacy of the driver with the vehicle.

In order to achieve the third object of the present invention, there is provided a vehicle communication apparatus that has a pseudo creature set in the vehicle and capable of communicating with a communication partner outside the vehicle through a function of the vehicle and, as a twelfth characteristic of the present invention, the pseudo creature has a communication means for communicating with a pseudo creature set in another vehicle.

As a thirteenth characteristic, the vehicle communication apparatus provided by the present invention further has a recognition means for recognizing a position of a pseudo creature set in another vehicle and a display means for displaying the recognized position of the pseudo creature set in the other vehicle. As a fourteenth characteristic, the vehicle communication apparatus provided by the present invention further has a notification means for informing a pseudo creature set in another vehicle of its own state.

In accordance with the twelfth to fourteenth characteristics, the user is capable of communicating with not only a pseudo creature set in its own vehicle but also a pseudo creature set in another vehicle. Particularly, in accordance with the thirteenth characteristic, the user is capable of knowing the position of a pseudo creature set in another vehicle and, in accordance with the fourteenth characteristic, the user is capable of informing a user riding another vehicle of its own state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a first diagram showing operations, etc. carried out by a meter CPU in response to an operation done by the user;

FIG. 10 is a third diagram showing operations, etc. carried out by the meter CPU in response to an operation done by the user;

FIG. 12 is an illustration diagram showing operations carried out in response to commands shown in FIG. 9; and FIG. 13 is an illustration diagram showing operations carried out in response to commands shown in FIG. 10.

DETAILED DESCRIPTION OF THE PREFERRED EMBODIMENTS

Figure 1:
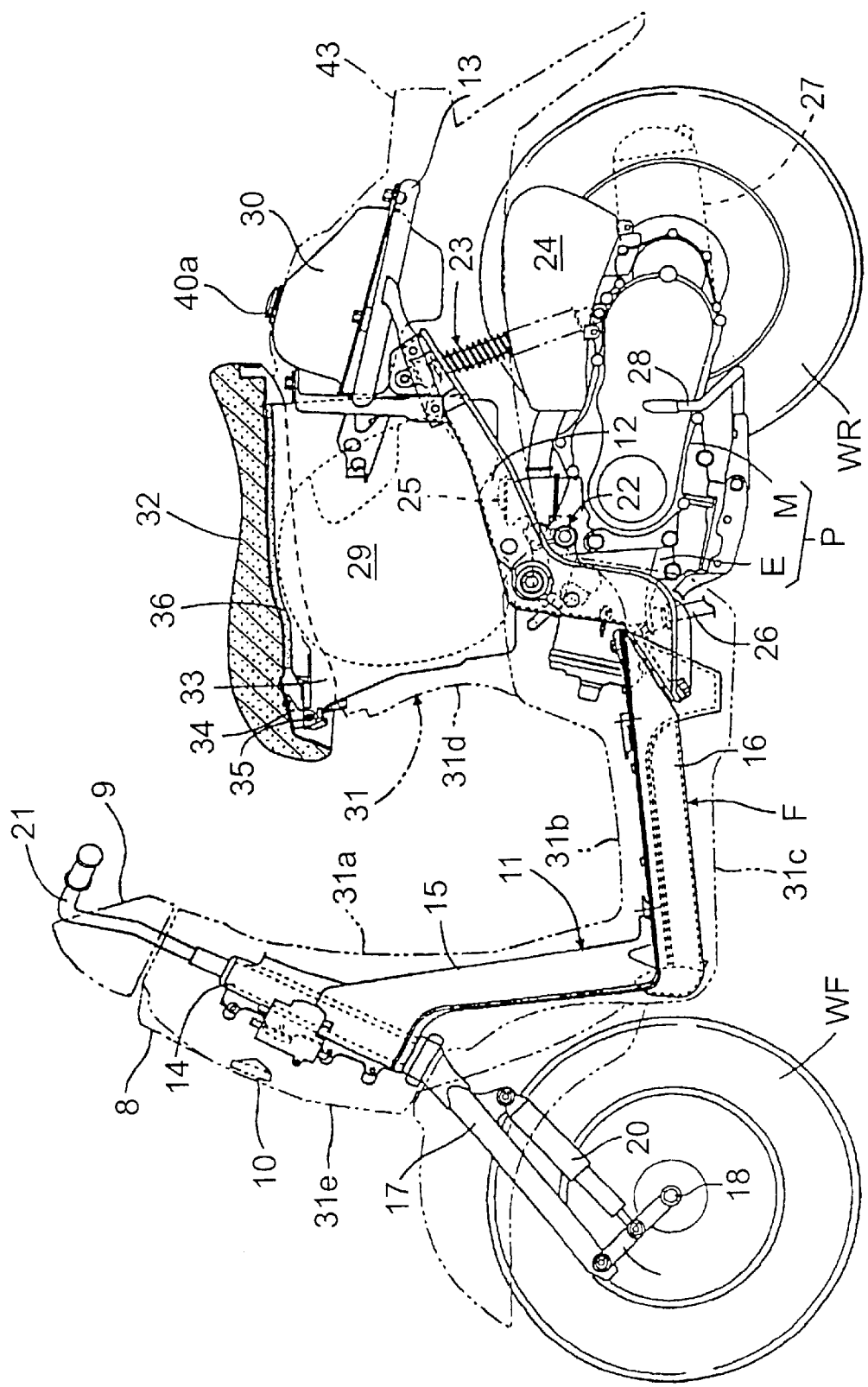
FIG. 1 is a diagram showing a side view of a motor-cycle on which a communication apparatus implemented by an embodiment of the present invention is mounted.

The present invention is explained by referring to diagrams as follows. FIG. 1 is a diagram showing a cross section of main components composing a motor-cycle employing a vehicle communication apparatus provided by the present invention. As shown in FIG. 1, the motor-cycle is a scooter vehicle with a vehicle-body frame F comprising a front frame 11, a rear frame 12 and a sub-frame 13. The front frame 11 is made by adoption of a casting technique with typically an aluminum alloy used as a material. The rear frame 12 is joined to the rear end of the front frame 11. Made by processing a pipe made of metal, the sub-frame 13 is joined to the rear end of the rear frame 12. The front frame 11 comprises a head pipe 14, a down frame 15 and a pair of right and left floor support frames 16, which are assembled to form an integrated body. The down frame 15 extends in a downwardly and rearwardly direction from the head pipe 14. The floor support frames 16 extend in the backward direction from the down frame 15.

The head pipe 14 supports a front fork 17 in such a way that the front fork 17 can be rotated with a high degree of freedom. Two arms of the front fork 17 sandwich a front wheel WF. The lower edges of the arms of the front fork 17 are positioned in front of a wheel shaft 18 of the front wheel WF. The lower edges of the arms of the front fork 17 are joined to the right and left ends of the wheel shaft 18 respectively by links 19. A front cushion 20 is provided to join the middle of the link 19 to the vertical middle of the front fork 17. A handle 21 is fixed on the upper end of the front fork 17.

A power unit P is supported at the longitudinal middle of the rear frame 12 by an anti-vibration link 22 in such a way that the power unit P can be swung. The power unit P comprises an engine E located in front of a rear wheel WR and a continuously variable transmission M located on the left side of the rear wheel WR. The engine E is typically a water-cooled single-cylinder 4-cycle engine with typically a cylinder thereof oriented all but horizontally toward the front of the vehicle body. The continuously variable transmission M is typically a belt transmission.

The rear wheel WR is supported by a shaft on a rear portion of the power unit P. A rear cushion unit 23 is provided between the rear portion of the power unit P and the rear frame 12. To the rear portion of the power unit P, an air cleaner 24 is attached above the rear wheel WR. The air cleaner 24 is connected to the engine E by a carburetor 25. An exhaust pipe 26, used for discharging exhaust gas from the engine E, extends from the engine E to the right side of the rear wheel WR. The exhaust pipe 26 is connected to an exhaust muffler 27 provided on the right side of the rear wheel WR. In addition, the engine E also supports a stand 28 in such a way that the stand 28 can be rotated with a high degree of freedom.

Used for accommodating a helmet or the like, a storage box 29 made of a synthetic resin is provided on the upper surface of the rear frame 12 forming the rear portion of the vehicle-body frame F. The storage box 29 is firmly held at a position above the engine E and the carburetor 25. A fuel tank 30 having a cap 40a for injecting fuel to the fuel tank 30 is supported on the sub-frame 13.

The vehicle-body frame F is veiled by a car-body cover 31 made of a synthetic resin. The car-body cover 31 comprises a leg shield 31a, a step floor 31b, an under cover 31c and a side cover 31d. The leg shield 31a covers a portion in front of the legs of the driver. The lower portion of the leg shield 31a is joined to the step floor 31b on which the feet of the driver are positioned. Joined to the leg shield 31a and the step floor 31b, the under cover 31c covers the bottom of the step floor 31b. Joined to the under cover 31c and the step floor 31b, the side cover 31d veils surfaces on both sides of the rear portion of the vehicle body.

A front shield 31e is attached to the front portion of the leg shield 31a. A display panel 9 is provided over the leg shield 31a and the front shield 31e. A horn 10 is provided inside the front shield 31e, and a head light 8 is provided over the horn 10. On the rearmost tail of the car body of the side cover 31a, a tail light unit 43 is provided. The tail light unit 43 includes a tail light provided at the transverse middle of the tail of the vehicle body, and rear blinkers provided on the right and left sides.

The fuel tank 30 and most of the storage box 29 supported on the rear frame 12 are covered by the side cover 31d. A seat 32 for covering the upper surface of the storage box 29 is attached over the side cover 31d in such a way that the seat 32 can close or cover the storage box 29. The cap 40a for injecting fuel is provided in such a way that the cap 40a protrudes out off the upper portion of the side cover 31d.

A bracket 33 is provided over the front edge of the storage box 29 in such a way that the bracket 33 protrudes in the forward direction. The bracket 33 supports a hinge plate 34 secured on the front edge of the seat 32 through a hinge pin 35, wherein the hinge plate 34 can be rotated around the bracket 33. In this way, the seat 32 is supported at the front edge of the storage box 29, wherein the seat 32 can be rotated in the upward and downward directions to respectively open and close the storage box 29. A seal rubber 36 is stuck on the bottom of the seat 32, being brought into contact with the entire circumference of the upper-end opening edge of the storage box 29. With the storage box 29 closed by the seat 32, the seal rubber 36 forms a seal between the seat 32 and the storage box 29. The seal rubber 36 also applies an elastic force to the seat 32 in the upward direction. Thus, the seat 32 is supported in such a way that, with the storage box 29 closed by the seat 32, the seat 32 can be moved up and down in a range with the low limit determined by the upward force against compression of the seal rubber 36, and the seat 32 can respectively open and close the storage box 29. The state of the seat 32 to close or open the storage box 29 is detected by a seat switch not shown in the FIG. 1.

Figure 2:
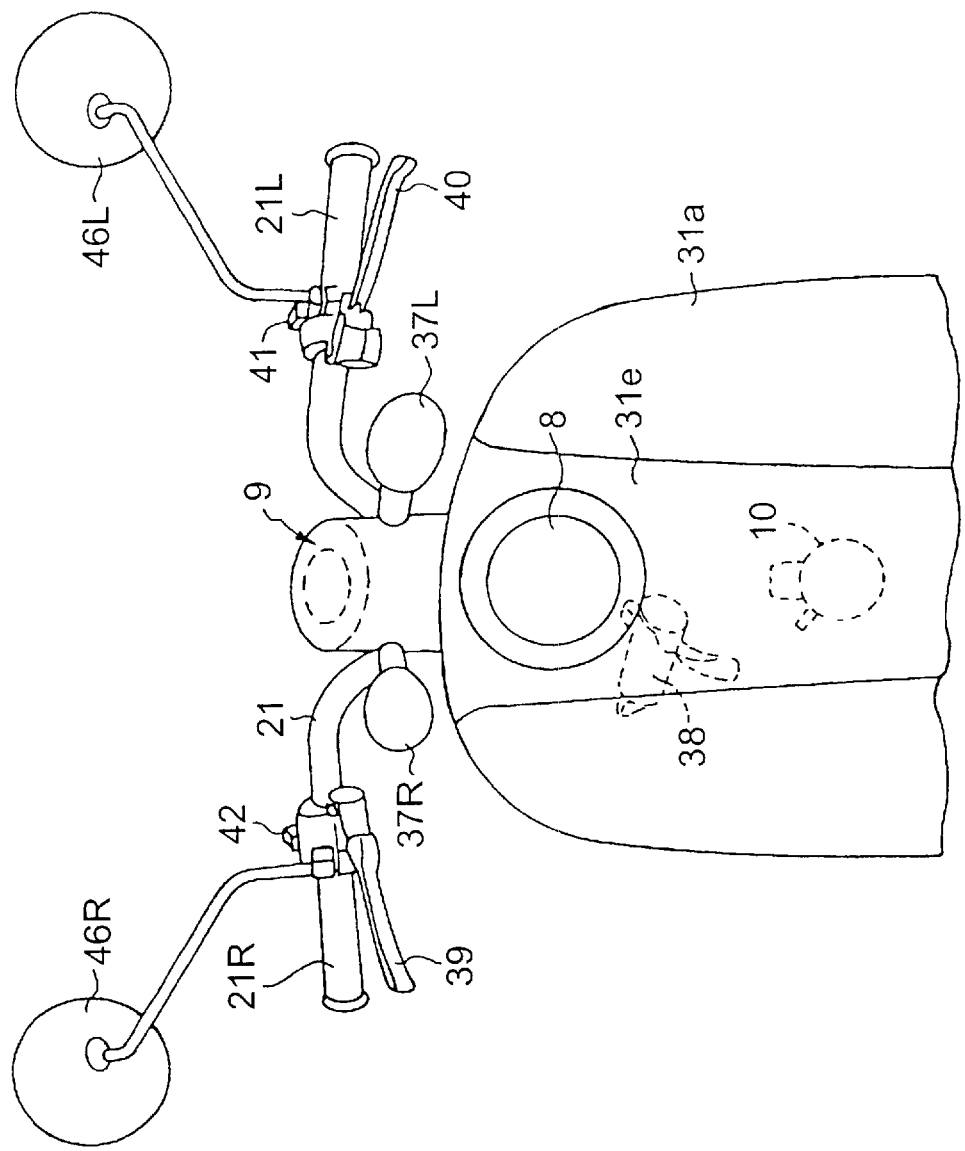
FIG. 2 is a diagram showing a front view of some main components of the motor-cycle shown in FIG. 1.
Figure 3:
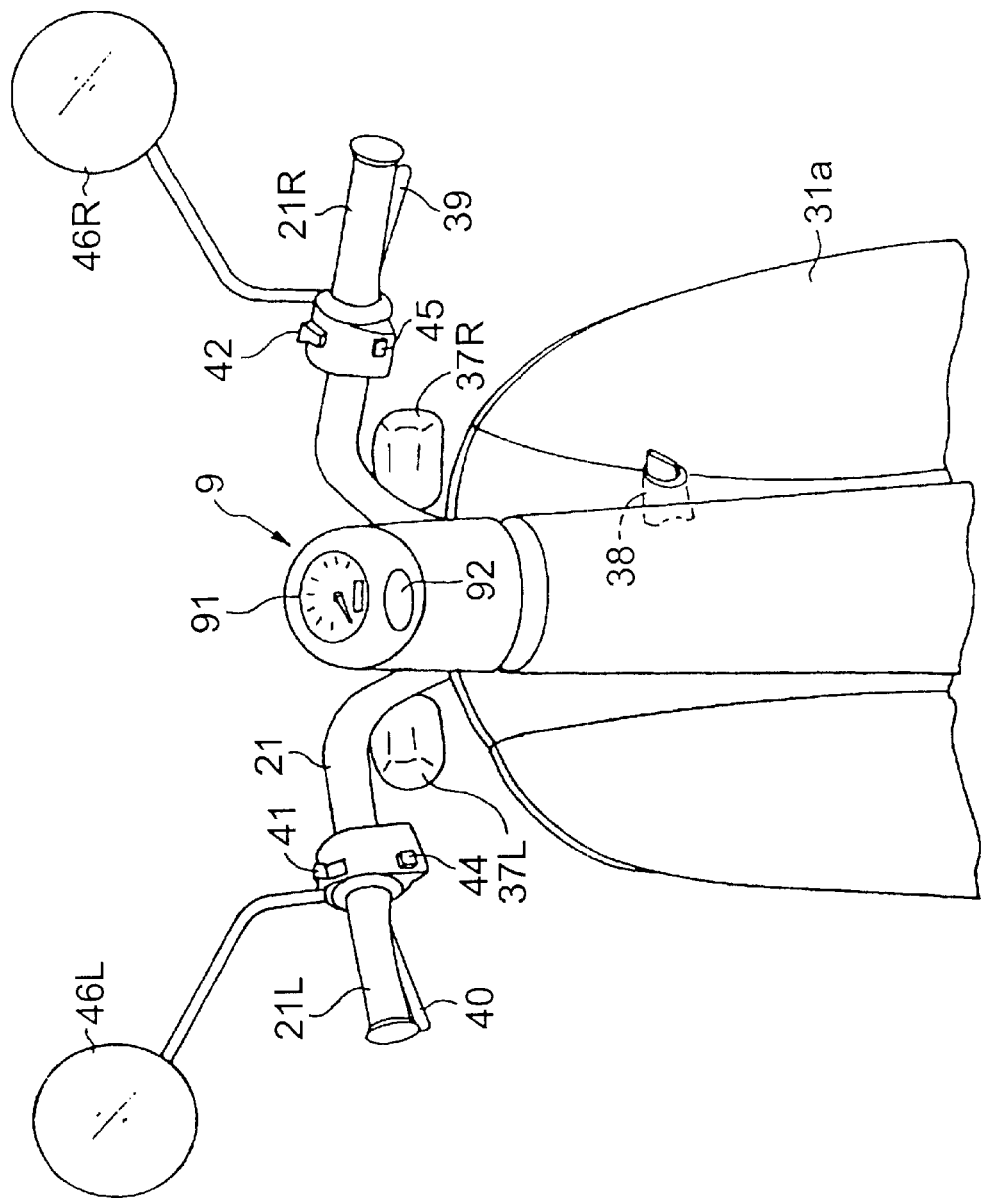
FIG. 3 is a diagram showing a squint view of some main components of the motor-cycle, which are seen from a position behind a leg shield of the motor-cycle.

FIG. 2 is a diagram showing a front view of some main components of the motor-cycle and FIG. 3 is a diagram showing a squint view of some main components of the motor-cycle, which are seen from a position behind the leg shield 31a. As shown in FIGS. 2 and 3, front blinkers 37L and 37R are provided on the display panel 9, each being oriented in the outward direction. On the leg shield 31a on the right side of the vehicle body, there is provided a power-supply switch 38, which can be operated by using a power-supply key.

A right-side grip 21R on the handle 21 is used for adjusting a throttle. A front-wheel brake lever 39 and a rear-wheel brake lever 40 are provided on the right-side grip 21R and a left-side grip 21L respectively. On the attachment root of each of the brake levers 39 and 40, that is, at a location in close proximity to a rotation axis of each of the brake levers 39 and 40, a brake switch is provided for detecting the operation of the respective brake. On the left-side handle 21, a head-light switch 41 and a horn switch 44 are provided. On the right-side handle 21, on the other hand, a blinker switch 42 and a start switch 45 are provided. Furthermore, mirrors 46L and 46R are provided on the left-side handle 21 and the right-side handle 21, respectively. The display panel 9 comprises a display 191 and a communication display unit 92. The display panel 9 will be described in more detail by referring to FIG. 4.

Figure 4:
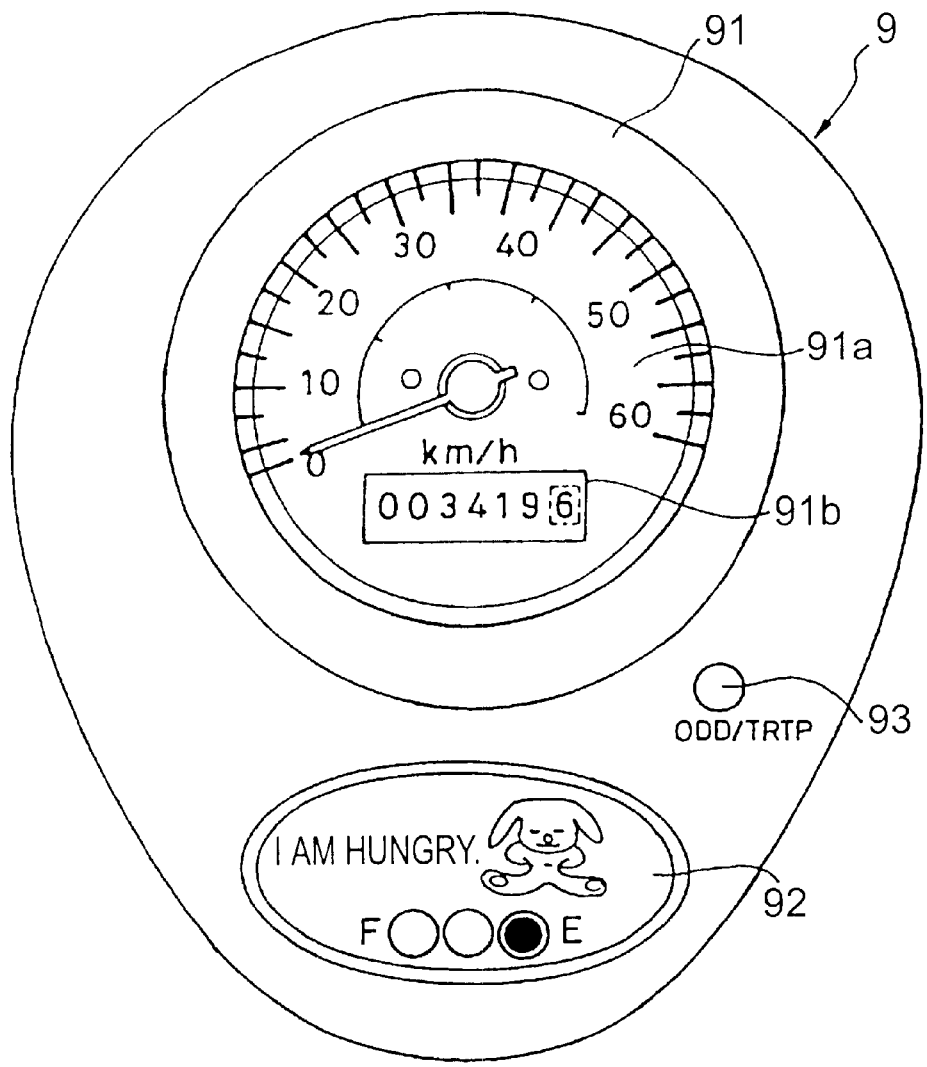
FIG. 4 is a diagram showing a top view of a display panel mounted on the motor-cycle.

FIG. 4 is a diagram showing an enlarged front view of the display panel 9. As shown in the FIG. 4, on the surface of the display panel 9, the display 91 and the communication display unit 92 described above are provided. In addition, a display-switching button 93 is provided for switching the display from an odometer to a trip meter and vice versa. The display 91 comprises a speed meter 91a for displaying the speed of the vehicle and a distance meter 91b, which can serve as the odometer or the trip meter in accordance with the operation carried out on the display-switching button 93. The displayed speed of the vehicle is a result of electrical detection. The operation carried out by the distance meter 91b can be digitally displayed on the liquid-crystal display device. An operation of a short duration carried out on the display-switching button 93 switches the distance meter 91b from the odometer to the trip meter or vice versa. In addition, an operation of a first long duration of typically 1 second carried out on the display-switching button 93 resets the trip meter. Moreover, an operation of a second long duration of typically 3 seconds displays the state of the vehicle.

The communication display unit 92 is a liquid-crystal display device for displaying the state of the vehicle and a result of communication with typically another vehicle.

Furthermore, the display panel 9 can also be provided with a microphone and a speaker system capable of generating a sound. It should be noted that neither the microphone nor the speaker system is shown in the FIG. 4.

The state of the vehicle or the like can not only be displayed on the communication display unit 92, but can also be expressed by auxiliary instruments provided on the vehicle. Examples of the auxiliary instruments are functional components such as the head light 8, the horn 10, the front blinkers 37L and 37R, the tail light unit 43 and the speaker system. That is to say, in this embodiment, the whole vehicle is assumed to be a pseudo creature. The vehicle assumed to be a pseudo creature has a configuration to make the user aware of information such as the state of the vehicle and data obtained as a result of communication between the vehicle and another electronic information-processing apparatus by driving the vehicle's display functions including the auxiliary instruments. In the communication display unit 92 shown in FIG. 4, for example, the amount of residual fuel is displayed as the character F representing a full fuel tank, the character E representing an empty fuel tank and by one circular indicator between the characters F and E. At the same time, in the case of a state close to an empty fuel tank, a character representing the pseudo creature is displayed along with a feeling-expression phrase stating: "I am hungry." In this example, the character representing the pseudo creature is a picture of a rabbit.

Figure 5:
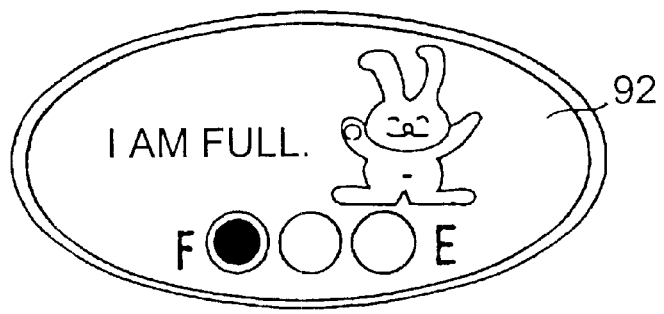
FIG. 5 is a diagram showing a typical display on a communication display unit.

FIG. 5 is a diagram showing another typical character representing the pseudo creature. As shown in FIG. 5, the state of the residual fuel in the fuel tank is displayed on the communication display unit 92 as a circular indicator representing a state close to a full fuel tank along with a phrase stating: "I am full" to indicate that fuel has been replenished.

Figure 6:
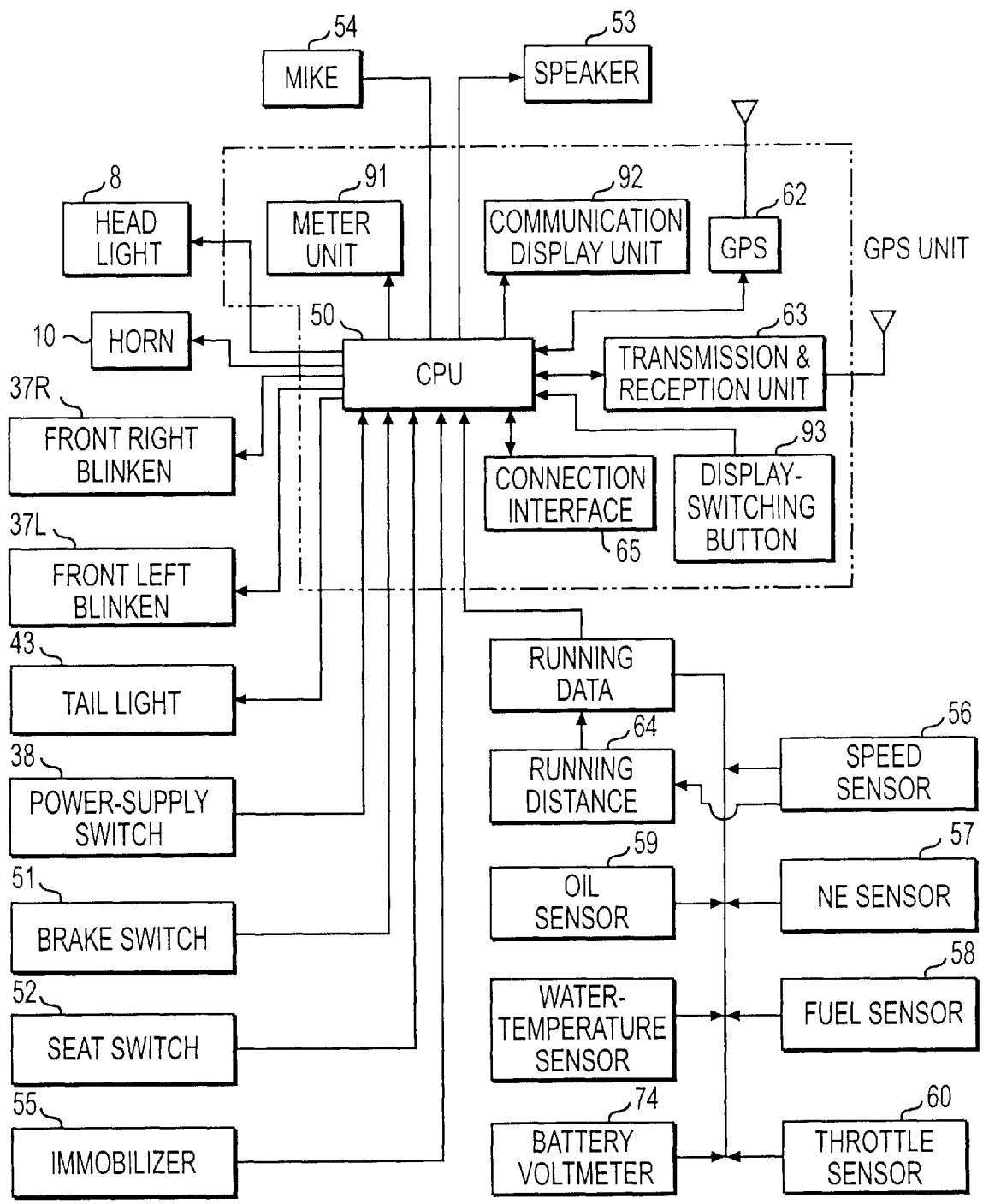
FIG. 6 is a block diagram showing interconnection between the display panel and components of a motor-cycle.

Next, the pseudo creature's typical expressions through a variety of display means provided on the vehicle are explained. The display means include instruments provided in advance on the vehicle for typical safety purposes. First of all, equipment for the vehicle serving as the pseudo creature is explained from the standpoint of a means for mainly displaying information. FIG. 6 is a block diagram showing the configuration of the display panel 9 and components connected to the display panel 9 and mounted on the vehicle.

As shown in FIG. 6, the display panel 91 includes a meter display CPU 50. The power-supply switch 38, a brake switch 51, a seat switch 52, a microphone 54, an immobilize system 55 and the display-switching button 93 are connected to the input side of the CPU 50. On the other hand, the head light 8, the horn 10, the front blinkers 37L and 37R, the tail light unit 43 and the speaker system 53 as well as the display panel 91 and the communication display unit 92 are connected to the output side of the CPU 50. It should be noted that the CPU 50 includes a clock unit having a calendar function.

In addition, the CPU 50 also includes a GPS unit 62, a transmission and reception unit 63 and a connection interface 65. The GPS unit 62 detects information on the position of the vehicle. The transmission and reception unit 63 is capable of transmitting and receiving information to and from another electronic information-processing apparatus. The connection interface 65 serves as an interface with external components.

Running data is supplied to the CPU 50. The running data includes a distance measured by a running-distance measurement unit 64 and pieces of information on the state of the vehicle, which are detected by instruments such as a speed sensor 56, an engine rotation sensor (Ne sensor) 57, a residual-fuel-amount sensor (fuel sensor) 58, an oil-amount sensor (oil sensor) 59, a throttle sensor 60, an engine-cooling-water-temperature sensor (water-temperature sensor) 61 and a battery-voltage meter 74.

Figure 7:
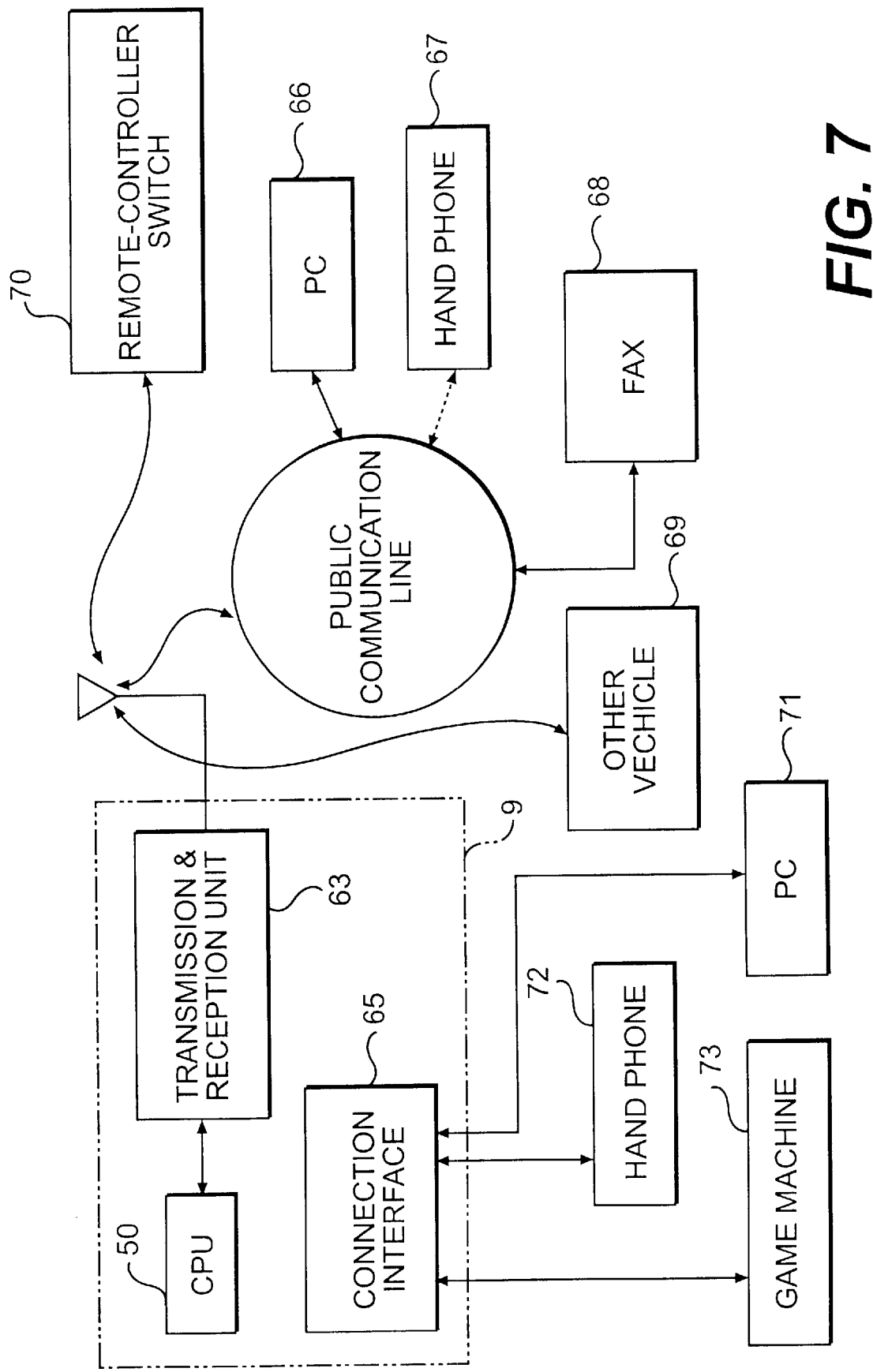
FIG. 7 is a block diagram showing interconnection between the display panel and other electronic information-processing apparatuses or electronic media.

FIG. 7 is a block diagram showing electronic information-processing apparatuses connected to the CPU 50. The transmission and reception unit 63 is capable of transmitting and receiving information to and from a personal computer 66 referred to hereafter simply as a PC, a hand phone 67 and a fax machine 68 including a telephone through a public communication line. The transmission and reception unit 63 also has a function for transmitting and receiving information to and from a display panel mounted on another vehicle 69 through a radio communication, and a function for receiving a command to turn on a power supply from a remote controller 70 capable of transmitting a radio signal. In addition, the connection interface 65 is connected to such apparatuses as a PC 71, a hand phone 72 connectable to the Internet and a computer game machine 73.

Figure 9:
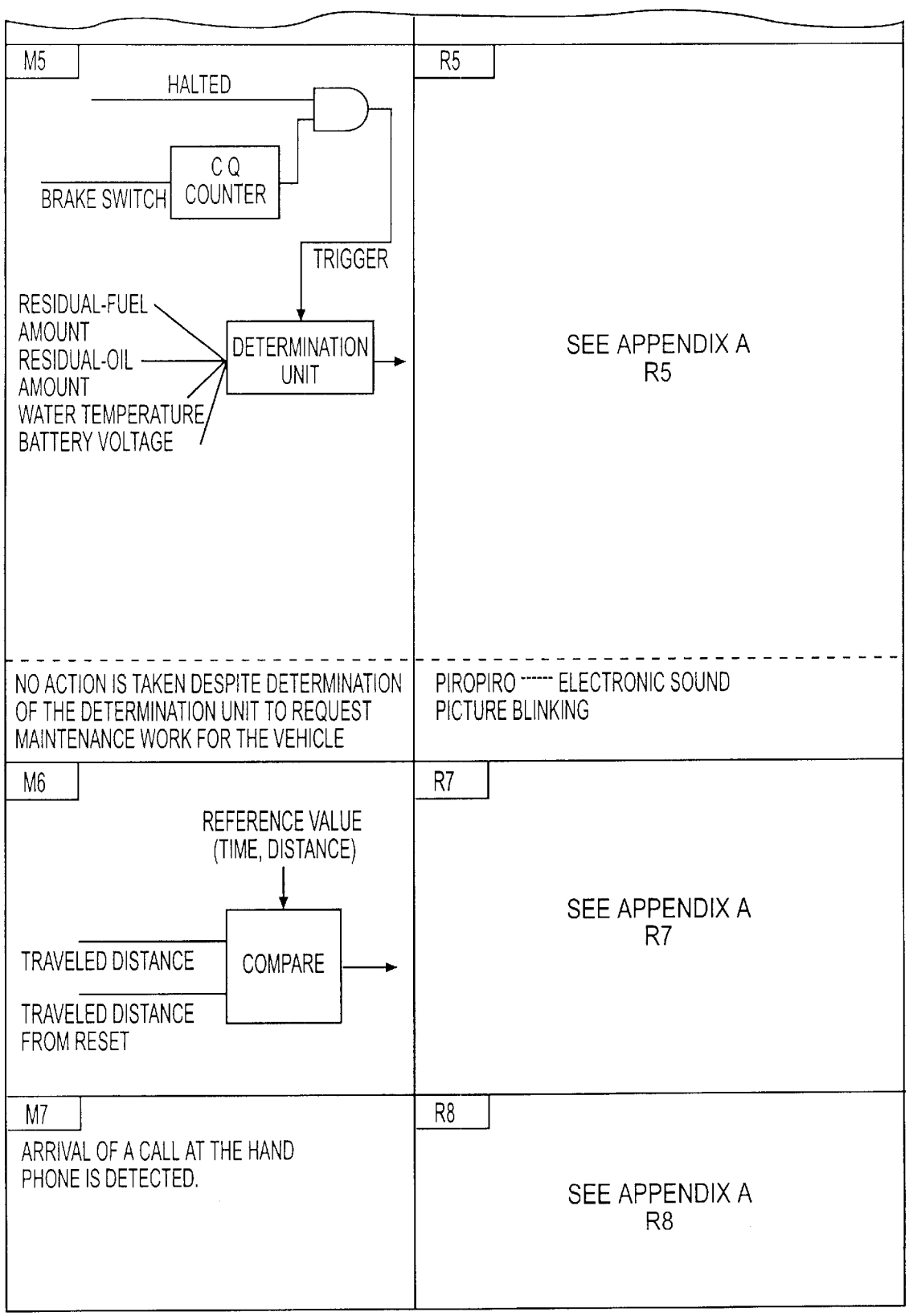
FIG. 9 is a second diagram showing operations, etc. carried out by the meter CPU in response to an operation done by the user.
Figure 11:
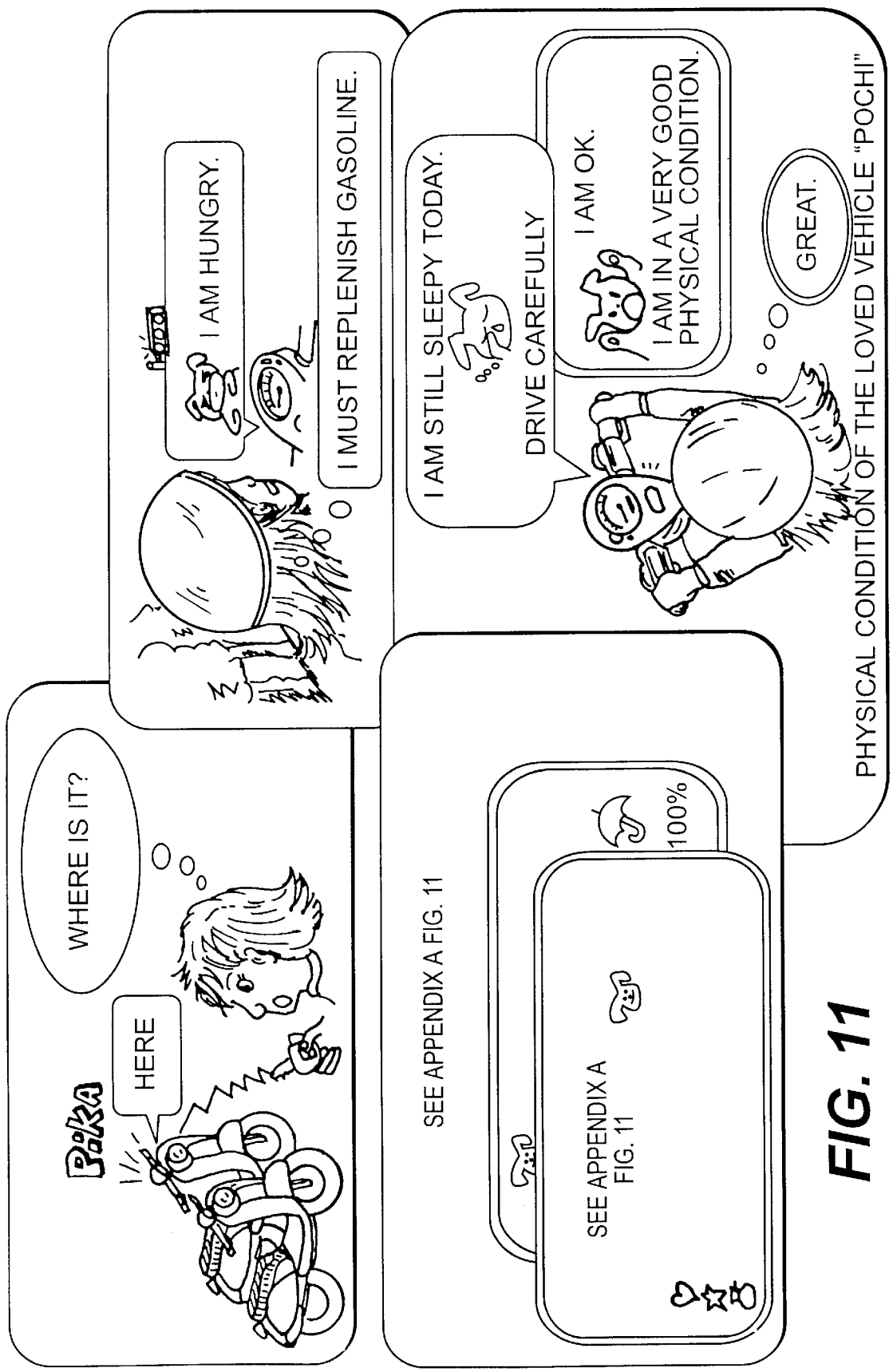
FIG. 11 is an illustration diagram showing operations carried out in response to commands shown in FIG. 8.

The following description explains typical processing to express the state of the vehicle or the like by means of the display panel 9 with the configuration described above. The left column of FIGS. 8 to 10 shows the operations carried out by the user and the states of the vehicle whereas the right column shows commands issued by the CPU 50 to the communication display unit 92 and the auxiliary instruments in response to, among other things, the operations on the left column, which are carried out by the user. FIGS. 11 to 13 are each an illustration diagram for helping the reader visually better understand the operations carried out in response to commands shown in FIGS. 8 to 10. To begin with, before getting on the vehicle, the user carries out an operation denoted by a symbol M1 shown in FIG. 8. To be more specific, the user turns on a remote control switch 70 when the seat switch 52 is in an off state. As a reaction R1 to the operation M1, a blinking command is issued to the front blinkers 37L and 37R as well as the tail light 43, a start command is issued to the engine and a forcing command to the horn 10. In accordance with these commands, the front blinkers 37L and 37R as well as the tail light 43 including the rear blinkers are each placed in a blinking state, the engine is started and the horn 10 is forcibly turned on for a predetermined period of time, which is typically 0.5 seconds.

The operations of these auxiliary instruments are expressed by behaviors or states of the pseudo creature. To be more specific, the blinking state of the blinkers and the tail light is expressed by winks or tail movements of the pseudo creature. The start of the engine is expressed by the waking of the pseudo creature and a sound generated by the horn 10 is expressed by a cry of the pseudo creature. The operations are carried out by the auxiliary instruments before the user gets on the vehicle in order to provide enjoyment to the eyes of the user and convenience to the user in locating the vehicle in a short period of time at, for example, a dark place or in a parking area where a number of motor-cycles are parked. The operations of these auxiliary instruments may be terminated in a predetermined period of time such as 5 seconds, or terminated in response to a next operation M2.

It should be noted that, instead of carrying out the operation M1 on the remote control switch 70, the user may also call out to the auxiliary instruments by outputting a voice command. In this case, the voice command issued by the user is recognized by typically comparing the command with a voice waveform cataloged in advance.

The operation M2 is the behavior of the user to sit on the seat 32 or an operation to turn the seat switch 52 on, and an operation to turn on the power-supply switch 38. As a reaction R2 to the operation M2, a greeting message from the vehicle is displayed on the communication display unit 92 and a pseudo sound such as the sound of "wing" or "piropiro" is generated electronically from the speaker 53 in response to the operations to turn on the seat switch and the power-supply switch 38. Then, a physical-condition message is displayed on the communication display unit 92 to inform the user of the condition of the vehicle.

Examples of the greeting message are "Good morning", "I haven't seen you for a long time" and "A happy birthday". Determination to display the "Good morning" greeting message is based on information on the time obtained from the clock unit of the CPU 50. Depending on the time, a "Good afternoon" or "Good evening" greeting message may be displayed instead of the "Good morning" message.

The "I haven't seen you for a long time" greeting message is displayed when a time longer than a predetermined period has lapsed since the last operation to turn off the power-supply key. The "A happy birthday" greeting message is displayed on the user's birthday, which is typically stored in advance in a memory of the CPU 50. To put it in detail, the calendar function compares each day with the stored birthday and, when a day matches the stored birthday, the "A happy birthday" greeting message is displayed. Examples of the physical-condition message are "I am extremely well" and "Today, let's go to a far place." A determination to display a physical-condition message is based on information on the amount of residual fuel obtained from the fuel sensor 58 and information on the amount of residual oil obtained from the oil sensor 59.

An operation M3 is an operation to temporarily halt the vehicle in the course of running. As a reaction R3 to this operation M3, a message saying: "We have been traveling a long distance." is displayed on the communication display unit 92 after a period of 2 seconds has lapsed since the vehicle was halted or the speed of the vehicle reached zero at an intersection on a red traffic light for example. A determination to display the "We have been traveling a long distance." character string is based on the distance traveled. As an alternative, a message saying: "The lucky color of today is - - - "is displayed on the communication display unit 92. A determination to display "The lucky color of today is - - - " character string is based on information on a color stored in advance along with the birthday of the user. As another alternative, an access to a weather forecast service office may be made through a public communication line to acquire a weather forecast, and a typical "It may rain." message obtained as a result of the access is displayed. In this case, it is desirable to set the weather forecast service office to provide the vehicle with information on a weather forecast in the form of typically an identification code recognizable by the display panel in response to a predetermined signal transmitted by the vehicle to make a request for the information for a weather forecast. By doing so, the CPU 50 is capable of recognizing the identification code representing the information on the weather forecast and, hence, capable of selecting a weather-forecast message to be displayed.

In place of information on a weather forecast presented by an external source, it is also possible to display a weather-forecast message based on data such as calendar information, information on time and information on brightness. Typically, the information on brightness is based on a voltage output by a photoelectric conversion device provided typically on the surface of the display panel 9. When the weather is judged to be not promising in spite of a day time during a rainy season, for example, a message saying typically: "It may rain." can be displayed.

A symbol M4 represents a state in which the amount of residual fuel is smaller than a predetermined value. As a reaction R4 to this state M4, a string of characters urging the user to replenish fuel is displayed on the communication display unit 92. Examples of such a character string are "I am hungry." and "Let's go to a gasoline station." If the lack of fuel remains as before even after a predetermined time has lapsed or a predetermined distance has been traveled since the issuance of the message urging the user to replenish fuel, a typical string of characters saying: "I can no longer run." is displayed or a "piropiro" sound is generated electronically. In place of such a character string or along with the string of characters, illumination of the screen of the communication display unit 92 is changed to give the user a warning.

An operation M5 is carried out to recognize the condition of the vehicle. An example of the operation M5 is an operation carried out by the user to grip and release the two brake levers 39 and 40 twice. This example is analogous to a double click of the computer operation. In this case, an operation to turn the brake switch 51 on and off is carried out twice within a predetermined period of time. As a reaction R5 to the operation M5, a string of characters saying: "A very good condition." is displayed on the communication display unit 92 to indicate that the amount of residual fuel and the amount of residual oil each exceed a predetermined quantity, or a string of characters saying: "I am still sleepy." is displayed on the communication display unit 92 to indicate that the temperature of the cooling water has not increased to a predetermined value. As another message, a string of characters saying: "It is cold today." is displayed on the communication display unit 92 to indicate that the temperature of the cooling water is still low in spite of the fact that a predetermined time has lapsed since an operation to start the engine. It should be noted that the operation M5 can be carried out as a substitute for an operation carried out on the display-switching button 93.

In addition, if a small amount of residual oil or a long traveled distance is detected in the operation M5, a string of characters saying: "You had better change the oil." is displayed on the communication display unit 92. If a low battery voltage is detected in the operation M5, a string of characters saying: "The electric charge of the battery is about to run out." is displayed on the communication display unit 92. If an idle cell motor is detected in the operation M5, a string of characters saying: "Let's us see a doctor." is displayed on the communication display unit 92. If no action is taken to correct the poor physical condition or the poor state of the vehicle, a typical string of characters saying: "I can no longer run." is displayed, a "piropiro" sound is generated electronically or illumination of the screen of the communication display unit 92 is changed to give the user a warning as is the case with the prompt for an action to replenish oil.

A symbol M6 denotes a state in which a predetermined distance has been traveled or a predetermined time has lapsed since the user got onto the vehicle for the first time. As a reaction R6 to a state in which a predetermined distance has been traveled, a string of characters saying: "You have done much." or "We have traveled a pretty long distance." is displayed on the communication display unit 92. As a reaction R6 to a state in which a predetermined time has lapsed, a string of characters saying; "Three months have lapsed since the time we saw each other last." is displayed on the communication display unit 92.

A symbol M7 denotes a state in which an incoming call arrives at the hand phone carried by the user. As a reaction R7 to this state M7 in which an incoming call arrives, illumination of the screen of the communication display unit 92 is changed and a string of characters saying: "There is a phone call." "Halt the vehicle at a safe place." or "Who is calling?" is displayed on the communication display unit 92. In order to detect the arrival of a call at the hand phone carried by the user, there is provided a memory area for storing identification information corresponding to the number of the hand phone owned by the user and an identification-information-determining means for detecting the arrival of a call matching the identification information.

A symbol M8 denotes a state in which the immobilize system 55 is operating. To put it in detail, in the state M8, the immobilize system 55 is forced to operate without operating a regular key when the vehicle is moved. As a reaction R8 to the forced operation M8 of the immobilize system 55, the horn 10 is driven and at least one of the lights is put in a blinking state to represent a reaction taken by the pseudo creature. As an alternative, a call to a phone number cataloged in advance is made. As another alternative, a fax machine or a PC cataloged in advance is activated to be informed of the vehicle's present position based on information on a position generated by the GPS unit 62. In a reaction taken to inform the fax machine or the PC of the present position of the vehicle, the map of an area in which the vehicle is located can also be transmitted to the fax machine or the PC.

An operation M9 is an operation carried out to catalog personal information on the user such as the birthday and the name of the user. That is to say, the operation M9 is carried out so as to store basic data used for displaying the string of characters saying: "The lucky color of today is - - - " in response to the operation M3 or "Three months have lapsed since the time we saw each other last." in response to the state M6.

An operation M10 is an operation carried out by the vehicle when the vehicle meets another vehicle having a display panel of the same type. When a friend's scooter set in advance arrives at a location within a predetermined distance, approaching the vehicle, the vehicle carries out this operation M10. Assume that the scooter of the friend has a display panel with a set pseudo creature of the same type as the vehicle. In this case, in order to recognize the position of the scooter belonging to the friend, a calling signal is transmitted to the scooter. A signal received from the partner in response to the calling signal indicates that the approaching partner is located at a near location. In addition, it is also possible to make a request for an accurate result of position detection by using the GPS unit 62. When the position of the scooter of the friend is close to the vehicle such as a reaction R10 to the operation M10, a string of characters saying: "Wow, K is approaching." or "A long time has passed since we last saw K." is displayed on the communication display unit 92 to inform the user that the friend is coming closer.

In addition, not only can an operation be carried out to display a string of characters on the communication display unit 92, but a communication with a display panel 9 mounted on the scooter of the friend can also be established typically to notify the friend of the user's own status such as the fact that the user is approaching the friend. For example, it is possible to display a string of characters saying typically: "Hello, K." on the communication display unit 92 of the scooter owned by the friend. In addition, voice information can also be transmitted through the microphone 54 to the display panel 9 mounted on the scooter of the friend. An example of the voice information is a message saying: "I will see you at the AA convenient store."

An operation M11 is an operation to connect the vehicle to the game machine 73. As a result R11 of this connection operation M11, the pseudo creature representing the vehicle is allowed to participate in a game. Assume that the game machine 73 has been designed into a configuration in which characters appearing on the stage can be changed or the number of such characters can be increased. Then, by connecting the display panel 9 to the game machine 73 and by cataloging the name of the pseudo creature representing the vehicle in the game machine 73 as the name of a character participating in the game, it is possible to let the pseudo creature representing the vehicle join the game as a game-participant character of the game machine 73. In this case, the progress of the game can be changed by using traveling data of the vehicle. For example, the power of the character rises or a hidden character is permitted to appear on the stage in accordance with an increase in the distance traveled. In addition, the power of a character increases or decreases in accordance with a variation in residual-fuel amount or a change in residual-oil amount.

It should be noted that in the case of a portable game machine serving as the game machine 73, the game machine 73 is used while the vehicle is being parked so that, by allowing the pseudo creature representing the vehicle to participate in a game, the user can enjoy the game. In addition, the user can enjoy the game having abundant variable substances such as changes in character power with the traveled distance in the course of the game.

An operation M12 is an operation to connect the vehicle to the PC 71. For example, game software is loaded onto the PC 71, which is provided with a function to transmit data for displaying a character appearing in a game to the display panel 9. As a result R12 of this connection operation M12 and the CPU 50 capable of communicating with the PC 71 receives the data for displaying a character of the game software and storing the data in a memory. It should be noted that, in order to display a character downloaded from the PC 71 on the communication display unit 92 in accordance with the conditions of the vehicle, the received data is processed by adoption of a predetermined algorithm matching the condition of the vehicle. By downloading the data for displaying a character, it is possible to set a pseudo creature matching a hobby of the user in the display panel 9. It should be noted that the function to download game software can also be provided in the game machine 73. In this case, the operation M12 is carried out to connect the vehicle to the game machine 73.

A character representing a pseudo creature is not limited to those read out from game software. Instead, it is also possible to use a character created by using the PC 71. In a word, any character can be used for representing the pseudo creature as long as data related to the character is acquired from an external electronic information-processing apparatus connected to the display panel employed in the vehicle directly or through the Internet.

In addition, if the PC 71 includes software for diagnosing the operation of a vehicle based on the running data of the vehicle, it is also possible to determine the operating condition of the vehicle on the basis of running data supplied by the CPU 50. A result of the diagnosis can then be displayed on the communication display unit 92.

Since the CPU 50 is capable of transmitting running data along with the identification information of the vehicle to a PC 71, in the case of a PC 71 owned by a motor-cycle dealer, the dealer is capable of informing the vehicle of a periodical inspection through a public communication line, for example, when it is time to carry out a periodical inspection on the vehicle. If the motor-cycle dealer transmits picture information as a notice of a periodical inspection to the vehicle, information on an inspection facility can be included in the notice and displayed as a picture on the communication display unit 92. The information on an inspection facility can be reported to the user by using a message of the pseudo creature received by the motor-cycle dealer. In this way, the user pays more attention to the information on an inspection facility and can recognize the necessity of maintenance with ease. As a result, the user can have the vehicle receive a maintenance service with good timing and have more trust in the motor-cycle dealer. In addition, the user is allowed to enjoy more visible variations in comparison with a message expressed by a monotonous string of characters.

An operation M13 is an operation to connect the vehicle to the hand phone 72 having a function to connect itself to the Internet. As a result R13 of this connection operation M13, it is possible to display information such as fortune-telling information and information on a weather forecast, which are acquired by the hand phone 72 through the Internet, on the communication display unit 92.

It should be noted that a figure can be added to each of the character strings displayed in response to the operations and the states shown in FIGS. 8 to 10. In addition, a response can be displayed as a figure only. In particular, it is desirable to let a character representing a pseudo creature appear on the screen of the communication display unit 92, expressing information to be delivered.

As is obvious from the above descriptions, in accordance with the present invention, since a pseudo creature can be introduced from electronic media such as Internet media, a computer game machine and a PC, it is possible to set pseudo creatures suiting tastes of a wide range of users. Particularly, in accordance with the present invention, by adding running data provided by a vehicle to the function of electronic media, the utilization value of the electronic media can be increased.

In accordance with the present invention, by using an electronic information-processing apparatus such as a phone, a fax machine or a PC, it is possible to form a judgment on the state of a vehicle or other states based on information received from the vehicle even if the electronic information-processing apparatus is separated away from the vehicle. By virtue of a way of utilization in which the user is informed of a call arriving at the phone of the user, for example, it is possible to further deepen the user's feeling of intimacy with the vehicle. In addition, in accordance with the present invention, a maintenance institution such as a vehicle dealer is capable of providing data such as maintenance information based on information received from the vehicle. In addition, a pseudo creature input by a maintenance institution can be set on the vehicle.

In accordance with the present invention, functional components provided in the vehicle in advance can be used for expressing an intention and a feeling of the pseudo creature. The user is capable of recognizing the expressed information with a high degree of reliability. Particularly, a light and a sound generated by the light devices and the warning device respectively can be distinguished from lights and sounds generated by external sources with ease. Thus, the light devices and the warning device are appropriate communication means mounted on the motor-cycle. In addition, since behaviors of the pseudo creature are represented by the light devices and the warning device, it is possible to impress the driver that the entire vehicle and the pseudo creature are one and, hence, to further deepen the intimacy of the driver with the vehicle.

In accordance with the present invention, it is possible to form a diversified-communication scene including users of other vehicles. Particularly, in accordance with the present invention, the user is capable of recognizing the position and the condition of another user. Thus, adequate communication among users can be established with ease.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

APPENDIX A

| | USER OPERATIONS, ETC | | VEHICLE OPERATIONS AND DISPLAYS |
|---|---|---|---|
| FIG. 8 | | | |
| M1 | SEAT SWITCH REMOTE CONTROLLER VOICE CALL | R1 | WINKER BLINKING<br>TAIL LIGHT BLINKING<br>HORN SHORT-TIME ON STATE<br>ENGINE START |
| M2 | SEAT SWITCH POWER-SUPPLY SWITCH | R2 | GREET MESSAGE<br>GOOD MORNING<br>I HAVEN'T SEE YOU FOR A LONG TIME.<br>A HAPPY BIRTHDAY<br>PHYSICAL-CONDITION MESSAGE<br>I AM EXTREMELY WELL<br>TODAY, LET'S GO TO A FAR PLACE<br>PSEUDO SOUND<br>WING<br>PIROPIRO<br>ELECTRONIC SOUND |
| M3 | HALTED VEHICLE CAR SPEED<br>CAR SPEED: 0 | R3 | WE HAVE BEEN TRAVELING A LONG DISTANCE. |

APPENDIX A-continued

| | USER OPERATIONS, ETC | | VEHICLE OPERATIONS AND DISPLAYS |
|---|---|---|---|
| | | | THE LUCKY COLOR OF TODAY IS --<br>IT MAY RAIN<br>DISPLAY OF CHARACTER STRINGS |
| M4 | RESIDUAL-FUEL AMOUNT<br>REFERENCE AMOUNT | R4 | I AM HUNGRY<br>LET'S GO TO A GASOLINE STATION |
| TIMER<br>AR<br>OIL<br>SUPPLY<br>FIG. 9 | TIME-UP OCCURS WITH<br>NO OIL SUPPLIED | | IPIROPIRO ---- ELECTRONIC SOUND<br>PICTURE BLINKING |
| M5 | HALTED<br>BRAKE SWITCH<br>RESIDUAL-FUEL AMOUNT<br>RESIDUAL-OIL AMOUNT<br>WATER TEMPERATURE<br>BATTERY VOLTAGE | R5 | IF THE AMOUNTS OF RESIDUAL FUEL<br>AND RESIDUAL OIL EXCEED<br>PREDETERMINED QUANTITIES, A<br>STRING OF CHARACTERS SAYING: "A<br>VERY GOOD CONDITION." IS<br>DISPLAYED.<br>IF THE AMOUNT OF RESIDUAL OIL IS<br>NOT ENOUGH, A STRING OF<br>CHARACTERS SAYING: "YOU HAD<br>BETTER CHANGE THE OIL." IS<br>DISPLAYED<br>IF THE TEMPERATURE OF THE<br>COOLING WATER IS STILL LOW, A<br>STRING OF CHARACTERS SAYING: "I<br>AM STILL SLEEPY." IS DISPLAYED.<br>IF THE TEMPERATURE OF THE<br>COOLING WATER HAS NOT INCREASED,<br>A STRING OF CHARACTERS SAYING: "IT<br>IS COLD TODAY." IS DISPLAYED<br>IF A LOW BATTERY VOLTAGE IS<br>DETECTED, ANY ONE OF THE<br>FOLLOWING STRINGS OF CHARACTERS<br>SAYING: "THE ELECTRIC CHARGE OF<br>THE BATTERY IS ABOUT TO RUN OUT."<br>"LET'S SEE A DOCTOR." OR" I CAN NO<br>LONGER RUN." IS DISPLAYED. |
| NO ACTION IS TAKEN DESPITE<br>DETERMINATION OF THE<br>DETERMINATION UNIT TO REQUEST<br>MAINTENANCE WORK FOR THE VEHICLE | | | PIROPIRO ____ ELECTRIC SOUND<br>PICTURE BLINKING |
| M6 | REFERENCE VALUE<br>TIME, DISTANCE<br>TRAVELED DISTANCE<br>TRAVELED DISTANCE FROM<br>RESET | R6 | IF THE TRAVELED DISTANCE HAS<br>EXCEEDED A REFERENCE VALUE,<br>EITHER ONE OF THE FOLLOWING<br>STRINGS OF CHARACTERS SAYING:<br>"YOU HAVE DONE MUCH." OR "WE<br>HAVE TRAVELED A PRETTY LONG<br>DISTANCE." IS DISPLAYED.<br>IF THE TRAVEL TIME HAS EXCEEDED A<br>REFERENCE VALUE, A STRING OF<br>CHARACTERS SAYING; "THREE MONTHS<br>HAVE LAPSED SINCE THE TIME WE<br>SAW EACH OTHER LAST." IS<br>DISPLAYED. |
| M7 | ARRIVAL OF A CALL AT THE<br>HAND PHONE IS DETECTED | R7 | THE SCREEN IS PUT IN A BLINKING<br>STATE.<br>ANY ONE OF THE FOLLOWING STRINGS<br>OF CHARACTERS SAYING: "THERE IS A<br>PHONE CALL..." "HALT THE VEHICLE AT<br>A SAFE PLACE." OR "WHO IS CALLING?"<br>IS DISPLAYED. |
| FIG. 10 | | | |
| M8 | IMMOBILIZER<br>MOVEMENT DETECTION | R8 | HORN DRIVING<br>LIGHT BLINKING<br>REPORT TO A PREDETERMINED<br>PHONE OR PC |
| M9 | DATA INPUT<br>PERSONAL-INFORMATION-<br>CATALOGING UNIT CAT-<br>ALOG THE DATA IN MEMORY | R9 | CATALOG THE DATA IN A MEMORY |
| M10 | APPROACHING ANOTHER<br>VEHICLE<br>SET IN THE SAME WAY | R10 | EITHER ONE OF THE STRINGS OF<br>CHARACTERS SAYING: "WOW, K IS<br>APPROACHING." OR "A LONG TIME<br>HAS PASSED SINCE WE LAST SAW<br>K." IS DISPLAYED.<br>A STRING OF CHARACTERS SAYING |

APPENDIX A-continued

| USER OPERATIONS, ETC | | VEHICLE OPERATIONS AND DISPLAYS | |
|---|---|---|---|
| | | | TYPICALLY: "HELLO, K." OR VOICE INFORMATION SAYING: "I WILL SEE YOU AT THE AA CONVENIENT STORE." IS TRANSMITTED TO THE OTHER VEHICLE. |
| M11 | CONNECTION TO A GAME MACHINE TRANSMISSION OF DATA | R11 | PARTICIPATION IN THE GAME MACHINE COMMAND TO CHANGE THE SUBSTANCE OF A GAME |
| M12 | CONNECTION TO A PC RECEPTION OF DATA OF A CHARACTER MAKING ITS APPEARANCE IN A GAME REQUEST FOR TRANSMISSION OF RUNNING DATA OF THE VEHICLE | R12 | RECEPTION OF CHARACTER DATA TRANSMISSION OF RUNNING DATA OF THE VEHICLE TO THE PC |
| M13 | CONNECTION TO A HAND PHONE CONNECTION TO THE INTERNET | R13 | FORTUNE-TELLING INFORMATION OR INFORMATION ON A WEATHER FORECAST IS DISPLAYED. |

FIG. 11

```
PIKA                                          I AM HUNGRY.
HERE      WHERE IS IT?                        I MUST REPLENISH GASOLINE.
GRAPHICAL DISPLAY SUCH AS FORTUNE - TELLING INFORMATION,
INFORMATION ON A WEATHER FORECAST OR A TIME
"POCHI", THE PSEUDO CREATURES
FORTUNE TELLING FOR TODAY
A GOOD LOVE AFFAIR                            I AM STILL SLEEPY TODAY.
LUCKY COLOR
A SO-SO FINANCIAL FORTUNE
                                              DRIVE CAREFULLY
                                              I AM OK. I AM IN A VERY GOOD
                                              PHYSICAL CONDITION.
                                              GREAT.
                                              PHYSICAL CONDITION OF THE
                                              LOVED VEHICLE "POCHI"
```

FIG. 13

```
CHARACTER DOWNLOADED FROM GAME SOFTWARE
A CHARACTER IS BEING SET.
EMBARRASSMENT      HELP, HELP ME!!
I AM HERE.   MAP FAX
I INFORM YOU OF EMBARRASSMENT.
HELP ME!
GRAPHICAL DISPLAY SUCH AS
FORTUNE - TELLING INFORMATION,
INFORMATION ON A WEATHER FORECAST OR A TIME
"POCHI", THE PSEUDO CREATURES
FORTUNE TELLING FOR TODAY
                                              COMMUNICATION WITH THE BOY
                                              FRIEND
                                              OK!
A GOOD LOVE AFFAIR
LUCKY COLOR                                   I WILL BE WAITING AT
A SO-SO FINANCIAL FORTUNE                     INTERSECTION
                                              OK!
```

What is claimed is:

1. A vehicle communication apparatus comprising:
a pseudo creature being set in said vehicle and capable of communicating with a communication partner outside said vehicle through a function of said vehicle;
said pseudo creature being introduced from an electronic media which is outside said vehicle through a communication means mounted on said vehicle for receiving said pseudo creature; and
a data-transmitting means for transmitting running data of said vehicle to said electronic media by way of said communication means,
said pseudo creature including an animated character on a visual display which is customizable by an operator of said communication partner outside of said vehicle, said pseudo creature also being capable of audio, verbal, and visual expression through a plurality of output means of said vehicle.

2. The vehicle communication apparatus according to claim 1, said apparatus receiving said electronic media by connected to the Internet.

3. The vehicle communication apparatus according to claim 1, said electronic media is at least one of a personal computer and a computer game machine and said pseudo creature is a character appearing in a game.

4. A vehicle communication apparatus having a pseudo creature set in said vehicle and capable of communicating with a communication partner outside said vehicle through a function of said vehicle comprising:
a communication means capable of communicating with an electronic information-processing apparatus outside said vehicle, said electronic information-processing apparatus is a personal computer set for maintenance of said vehicle;

a data-transmitting means for transmitting running data of said vehicle to an electronic media by way of said communication means, and a pseudo creature including an animated character on a visual display which is customizable by an operator of said communication partner outside of said vehicle, said pseudo creature also being capable of audio, verbal, and visual expression through a plurality of output means of said vehicle.

5. The vehicle communication apparatus according to claim 4, wherein said electronic information-processing apparatus is at least one of a telephone, a fax machine and a personal computer.

6. A vehicle communication apparatus having a pseudo creature set in said vehicle and capable of communicating with a communication partner outside said vehicle through a function of said vehicle, said communication apparatus comprising:

a functional component of said vehicle known as an auxiliary instrument provided to function as a communication means of said pseudo creature; and in order for said auxiliary instrument to represent an intention and a feeling of said pseudo creature, said auxiliary instrument is driven in accordance with a state of expression set in advance, said auxiliary instrument capable of displaying an animated character of said pseudo creature received from said communication partner outside of said vehicle on a visual display of said vehicle.

7. The vehicle communication apparatus according to claim 6, wherein said auxiliary instrument functioning as a communication means is at least either a light device or a warning device.

8. The vehicle communication apparatus according to claim 6, wherein said auxiliary instrument functioning as a communication means is a light device provided on a rear portion of said vehicle; and said light device is blinking when expressing a movement of an eye of said pseudo creature.

9. The vehicle communication apparatus according to claim 6, wherein said auxiliary instrument functioning as a communication means is a light device provided on a front portion of said vehicle; and said light device is blinking when expressing a movement of a tail of said pseudo creature.

10. The vehicle communication apparatus according to claim 6, wherein said auxiliary instrument functioning as a communication means is a warning device; and said auxiliary instrument is activated when expressing a cry of said pseudo creature.

11. A vehicle communication apparatus having a pseudo creature set in said vehicle and capable of communicating with a communication partner outside said vehicle through a function of said vehicle, said communication apparatus comprising:

a communication means for said pseudo creature that communicates with a communication means of a pseudo creature set in another vehicle; and a data-transmitting means for transmitting running data of said another vehicle by way of said communication means, said pseudo creature including an animated character on a visual display which is activated by said pseudo creature set in said another vehicle, said pseudo creature also being capable of audio, verbal, and visual expression through a plurality of output means.

12. The vehicle communication apparatus according to claim 11, and further including a recognition means for recognizing a position of a pseudo creature set in another vehicle; and a display means for displaying said recognized position of a pseudo creature set in another vehicle.

13. The vehicle communication apparatus according to claim 11, and further including a notification means for informing a pseudo creature set in another vehicle of its own state.

14. A vehicle communication apparatus comprising:

a storage means for storing a pseudo creature and for controlling said pseudo creature to act in a predetermined fashion in response to instructions received from the storage means;

a communicating device for communicating instructions from outside said vehicle to said storage means; and a display for displaying an animated character of the pseudo creature to a user of the vehicle, said pseudo creature also being capable of audio, verbal, and visual expression through a plurality of output means of said vehicle.

15. The vehicle communication apparatus according to claim 14, and further including a light device or a warning device to respond in accordance with the mood of the pseudo creature.

16. The vehicle communication apparatus according to claim 15, wherein said light device is a blinking light when expressing a movement of a character eye of said pseudo creature.

17. The vehicle communication apparatus according to claim 15, wherein said light device is a blinking light when expressing a movement of a character tail of said pseudo creature.

* * * * *